Aug. 25, 1925. 1,550,880
P. L. CLARK
PROJECTION SCREEN
Filed Nov. 15, 1921 2 Sheets-Sheet 1
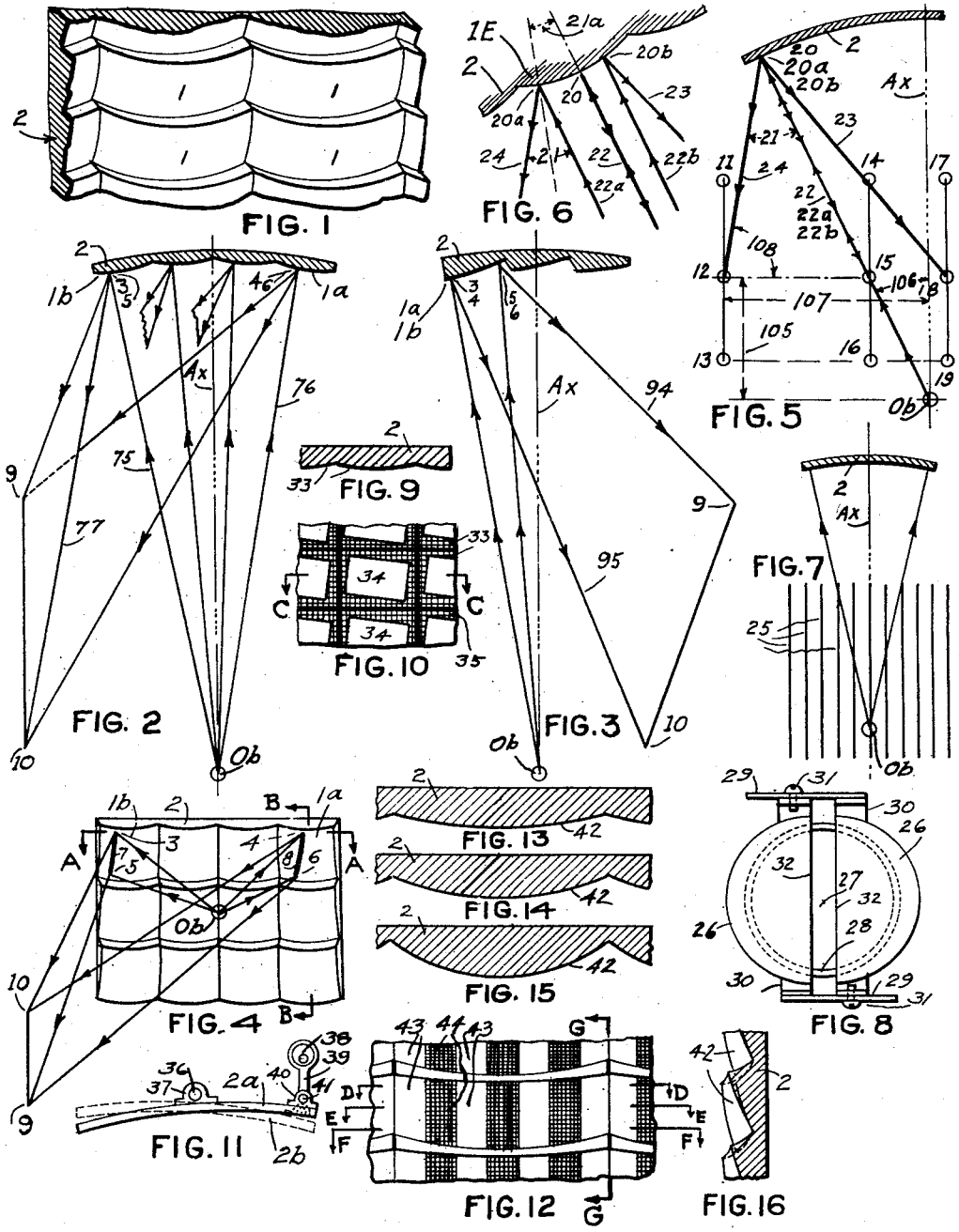
INVENTOR:
Paul L. Clark Aug. 25, 1925.

P. L. CLARK 1,550,880

PROJECTION SCREEN

Filed Nov. 15, 1921

2 Sheets-Sheet 2

INVENTOR:
Paul L. Clark.

Patented Aug. 25, 1925.

1,550,880

UNITED STATES PATENT OFFICE.

PAUL L. CLARK, OF BROOKLYN, NEW YORK.

PROJECTION SCREEN.

Application filed November 15, 1921. Serial No. 515,283.

*To all whom it may concern:*

Be it known that I, PAUL L. CLARK, of #30 Prospect Park, S. W., in the borough of Brooklyn, city of New York, county of Kings, State of New York, and a citizen of the United States, have invented certain new and useful Improvements in Projection Screens, of which the following is a specification.

This invention relates to projection screens and more particularly to screens for displaying either still or moving pictures or both still and moving pictures, a part or the entire surface of which screens is composed of a great plurality of relatively small specularly reflecting elements or reflectors which may be plane or curved, or a combination of plane and curved. One object of the present invention is to provide a screen for simultaneously or intermittently dispersing distinct and separate images of a plurality of images projected thereupon into one zone or a plurality of zones; and in this connection it may be stated that the improved screen herein disclosed may be used for the observation of stereoscopic pictures which, as is generally known, appear to the observer to have three dimensions.

In order to accomplish this result, the component pictures comprising the stereoscopic views are projected upon the screen by projectors or lanterns a suitable distance apart (and so focused that if each projector is using the same view the images of the views carried by both projectors will substantially coincide upon the screen), one projector showing the views to be observed by the right eyes of the observers and the other projector showing the pictures or views for their left eyes. In the modification shown in Fig. 11, however, both the right and left eye pictures may be alternately positioned on the same film and projected in rapid succession through the same objective lens, if desired.

By referring to my Patent No. 1,122,192, page 3, line 125 to page 4, line 95, the feature of simultaneously projecting a plurality of images upon a screen provided with shallow reflecting elements is found briefly described.

If the specular elements are made very shallow, flat or nearly flat from side to side or top to bottom, it is evident that the pencil reflected from them along the axis of curvature will be dispersed through a very narrow angle either sidewise or up and down, as the case may be. For example, if a small flat mirror receive a ray or pencil of light from some distant source it will reflect the ray through an angle of narrow divergence. The screen disclosed in the present specification may be compared to a bank of thousands of small flat or slightly curved mirrors, all at special (generally different) angles of inclination to the incident rays projected upon them by the lantern, the angle of each mirror of any given series or bank being such that it reflects the incident ray, received upon it from the lantern, in such a direction as to intersect a given viewing plane at a predetermined point or small area; the aforesaid small area being the proper position for, say, the right eye of the observer. It should be understood that the light from this shallow or flat element must be reflected through a beam of limited sidewise divergence in order that the spread of the rays destined for the right eye of the spectator be such as to exclude light from the left eye; or more correctly, that the overlap of the right and left beams at their areas of observation be not quite equal to the distance between the eyes of the spectator. Also, the total width of the beam at its most remote intersection with the viewing surface should not ordinarily exceed the distance between the right eye of an observer in one line of sight and the left eye of an observer in the next adjacent line of sight, to the right.

A complete screen, provided the elements be flat, which is the preliminary conception, would comprise (when using two projectors) as many perfect screens as there would be observers, and each of the flat, slightly separated mirrors comprising each of these screens would lie on the imaginary surfaces of concentric ellipsoids, the foci of the ellipsoids for any one of the screens being, one at the objective lens, and the other at either the right or left eye of the observer. Since, however, the construction of a screen employing flat reflecting elements, although theoretically simple, would be difficult, I prefer to use a construction employing curved elements, or sub-elements, which reflect the light into long narrow zones, equispaced or otherwise, an example of a single such zone being shown in Fig. 35 of my Patent No. 1,279,262.

In the drawings, Fig. 1 is a perspective view of a plurality of typical specularly reflecting elements, many thousands of which would comprise a complete screen. Figs. 2, 3 and 4 are respectively cross-sections at A—A and B—B, Fig. 4; and a front elevation of a plant comprising a projector and specular screen: and show the paths of rays to and from the screen to intersect a given viewing line. Fig. 5 is a diagram showing means for determining certain necessary factors required in the design of a stereoscopic screen; this is a plan view. Fig. 6 is an enlarged view, showing a detail of the element containing the point 20, Fig. 5. Fig. 7 is a plan view showing a screen and a characteristic arrangement of alternate viewing zones. Fig. 8 is a front elevation of a two-part shutter for adjusting the aperture of an objective lens for use with the screen shown in Fig. 11 or with any other type of screen. Fig. 9 is a section on C—C, Fig. 10; and Fig. 10 is a front elevation of a modified type of specular surface having blackened or roughened non-reflecting portions to absorb or deaden the undesirable light. Fig. 11 is a plan view showing a curved screen adapted to be oscillated synchronously with the film exposure. Figs. 12, 13, 14, 15 and 16 are respectively a front elevation and sections D—D, E—E, F—F and G—G, Fig. 12; showing a modified type of element provided with alternate reflecting and non-reflecting strips or sub-elements. Fig. 17 is a magnified front elevation of an oblique spherical element, showing the approximate curvature of a line on the reflecting surface, the said line being that part of the specular surface of the element which will reflect light to intersect a viewing plane in a straight line or narrow straight area; the several curved lines shown on the surface being adapted to reflect light into several given parallel lines in vertical parallel planes, as determined by the diagram shown in Fig. 5. Figs. 18 and 19 are magnified front views of an element similar to that in Fig. 17, but with superimposed non-reflecting strips. Figs. 20, 21 and 22 show modified types of parts of an element provided with reflecting and non-reflecting areas, these views being front elevations. Figs. 23 and 24 are respectively a front elevation and a section at H—H, Fig. 23, of a part of an element provided with sub-elements which are curved longitudinally and either flat or slightly curved transversely, the general surface of such an element following the surface of a convex surface of revolution. Fig. 25 is a section similar to that shown in Fig. 24, and shows the position of the surfaces as intermediate between, or bisecting the angles of those shown in Fig. 24. Figs. 26, 27, 28, 29 and 30 are respectively a front elevation and sections of Fig. 26 at J—J, K—K, L—L and M—M. Figs. 31 and 32 are plan views showing modified arrangements of the intersections of corresponding beams of light in the viewing plane. Fig. 33 is a plan view showing a diagram for determining several factors required in the design of a stereoscopic screen. Figs. 34, 35 and 36 are respectively a front elevation and sections at N—N and O—O, Fig. 34, showing a modified arrangement of reflecting elements. Figs. 37, 38 and 39 are respectively a front elevation and sections at P—P and Q—Q, Fig. 37, showing a modified type of reflecting structure. Fig. 40 is a front elevation of a screen, showing a proposed grouping of the elements on curved, oblique axes.

In Fig. 1 the curved specular elements 1 are shown integral with the structure of the screen 2. It will be noted that the elements are of greater width than height, are convexly curved and similar in design to those shown in my Patent No. 1,279,262. The elements may be provided with blackened strips, similar to those shown in Fig. 12, or with oblique curved strips contacting on curved lines as shown in Fig. 23, or composed of a plurality of independent reflecting units like those in Figs. 26 and 34; or as shown in several modifications in my patent application, Ser. No. 406,382.

In Figs. 2, 3 and 4, a projector having its objective lens positioned at or near the point $O^b$ sends a beam of light containing pencils of rays 75, 76 in the directions indicated by the arrowed lines to strike certain curved reflecting elements $1^a$, $1^b$ (shown greatly magnified for diagrammatic purposes) on the concave screen 2. Referring to Figs. 3 and 4, it is seen that the rays which strike the upper portion of the element at the points 3, 4, are reflected as shown by the line 95 and intersect the line 9—10 in the viewing plane at the point 10; while the rays striking the elements lower down, at points 5, 6, are reflected through the point 9 of the viewing line; rays striking the element between the points 3 to 5 and 4 to 6 are reflected in a continuous line between the points 9 and 10. The typical curved lines 3—5 and 4—6 which reflect light in a continuous line between the points 9—10 are in reality narrow strips on the surface of each element, alternate elements or elements in alternate rows; and these strips are what are termed "sub-elements" in this specification, in order to distinguish them from complete elements such as those shown at 1, Fig. 1, and at $1^e$, Fig. 6. If the surfaces of the elements $1^a$, $1^b$ are spherical the actual portions of the surface of the element which will reflect rays through the line 9—10 are shown by the sub-elements 7, 8, Fig. 4. The determination of the shape and position of the sub-elements from side to side on the elements is essential to a complete design of the screen and is described in connection with Figs. 5, 6, 17, 33, etc.

In Figs. 5 and 6 a projector (not shown) located at or near the point $O^b$, sends a pencil of rays (comprising a relatively small portion of its total light beam) to fall upon an element at points 20, $20^a$, $20^b$, on the screen 2. The diagrams show three rays, 22, $22^a$, $22^b$, which are contained in the pencil directed upon the element 1E which is assumed as spherical, convex and specularly reflecting. The ray 22 strikes the element at such an angle as to be reflected back in a vertical plane normal to the surface of the element at its middle point, so that in the plan views, Figs. 5 and 6, the reflected ray will lie under the incident ray 22 and will intersect the viewing line 14—16 at point 15. Similarly, the rays $22^a$ and $22^b$ are reflected as shown by lines 24, 23, so as to pass through points 12, 18 in the viewing lines 11—13, 17—19. Assume, in Fig. 5, that the position of the point 12 (being the point where the viewing line 11—13 is intersected by the reflected ray 24) in space is known; or in other words, that the rectangular coordinates 107 and 105 are known with relation to the central axis $A^x$ of the screen 2 and a plane perpendicular to said axis and passing through the point $O^b$. Assume also that the length of the line 22 is equal either to the radius of the screen (or the radius as projected on a horizontal plane); further assume the angle 106 lying between the vertical plane of the axis $A^x$ and the vertical plane of the incident and reflected ray 22. The angles 108 and 21 may now be determined by substituting the assumed, or known, values in the following equation.

$$(1) \quad \tan 108 = \frac{(22 - 105x \sec 106)x \sin (90° - 106)}{(107 - 105x \tan 106) - [(22 - 105x \sec 106)x \cos (90° - 106)]}$$

Having determined the value of the angle 108, angle 21 is found by substituting in the equation:

$$(2) \quad 21 = 180° - [108 + (90° - 106)]$$

The vertical plane containing the line 22 has been assumed normal to the general screen surface and consequently is normal to the middle of the element 1E at the point 20, Fig. 6; and since the angle 21 between the vertical planes of the incident and reflected ray through the point 12 has been determined by equation (2), it is evident that the horizontal angle of surface curvature on the element between the points 20 and $20^a$ is half the angle 21, as fully described in applicant's Patent No. 1,279,262. Consequently it is seen how simple it is to determine the number of degrees to the left of the middle point 20, Fig. 6, from which a ray of light $22^a$ will be reflected in the vertical plane 24 so as to pass through a given point 12 whose position in space is known. By considering the angle 106 and the ordinate 107 as constants for cases in which all rays to a single element (which rays are reflected by said element to pass through several points in the viewing line 11—13) and assuming different values for the ordinate 105, it is possible by substituting in the above equations to determine as many values of the angle 21 as are necessary to plot a curve such as shown by the line $11^a$—$13^a$, Fig. 17. It should be understood that although the calculations given above in connection with Figs. 5 and 6 apply only to angles and ordinates in a horizontal plane, they may be also applied in determining values in a vertical plane; and the resultant values in an oblique plane or planes at any desired angle may be readily computed by those versed in mathematics and in the principles of optics. The equation (1), above, applies only to points in lines such as 11—13 which are to the left of the normal ray 22: equations for determining values in lines such as 14—16 and 17—19 are, however, readily worked out trigonometrically, so that there is no use in giving them here. The same applies to calculations to determine the points of incident and reflected rays from elements of any configuration and position on screens of any desired shape, whether flat, concave or convex; cylindrical or combinations of the above; in order that the reflected rays intersect either straight or curved lines or areas anywhere in space: additional data is, however, given in my patents above referred to, while the broad idea of illuminating a surface of any desired configuration such, for example, as the line 11—13, Fig. 5, by means of a plurality of closely adjacent reflectors arranged in a bank, is shown in Fig. 7 of my patent No. 842,860. A clear conception of the position of a small flat mirror located at the point 20 may be had by bearing in mind the fact that in order for such a mirror to reflect a ray from $O^b$ so as to pass through the point 12 the said mirror would have to be perpendicular to the bisector of the true angle formed between the lines of the incident and reflected rays.

In Fig. 7 rays of light shown by the arrowed lines are directed from a projector lens at $O^b$ to the screen 2, the sub-elements of which are so shaped and positioned as to reflect light to intersect a viewing surface in a series of substantially equispaced, parallel lines or narrow areas 25, any particular one of the lines 25 corresponding substantially to a curved or straight line such as 9—10, Fig. 2, and every point in each of the lines 25 receiving light from the sub-element designed for that particular line, the said sub-element being one of as many sub-elements as there are lines 25, and there also being as many sub-elements per element (or group) as there are lines 25. Referring back to Fig. 4, it should be understood that an element such as 1$^b$ should ordinarily comprise a surface of curvature sufficient to contain enough sub-elements such as shown at 7 to direct light to intersect each and all of the lines 25, Fig. 7. An element containing five sub-elements is shown in Fig. 18.

In Fig. 8 two semi-circular opaque discs 26 are adjustably connected to enable them to be slid apart to vary the width of the slot or aperture 27 in front of an objective lens, to the barrel 28 of which lens the said discs are attached. An adjustable effective aperture of the shape of 27 is useful in limiting the width of the cone or pyramid of rays emerging from the objective lens to the screen, in order to control the width of the reflected beams from the screen at their intersections with the viewing surface.

In Figs. 9 and 10 a plurality of curved elements 33 on the screen structure 2 are shown with blackened portions 35, leaving the clear portions 34 for reflection of light to the desired areas. The portions 34 represent the parts of typical elements which parts are required to be divided into a series of slightly separated sub-elementary areas such as shown in Figs. 12, 18, 20, etc.

In Fig. 11 a concave screen 2$^a$ is provided with a bearing 37 on a fixed spindle 36, so that the screen may be vibrated into the position 2$^b$ by means of an eccentric and rod 39 connected to a bearing 40 at one end of the screen. The eccentric turns on the spindle 38 on a fixed axis. An arrangement such as that here shown permits the oscillation or vibration of the screen through such an amplitude, generally very small, as to permit the use of a single objective lens for the showing of stereoscopic pictures, by using a moving picture film having its alternate films one a left eye and the next a right eye view, and vibrating the screen intermittently or synchronously with the projection of the pictures on the screen, so that for right eye views the screen is at the end of its amplitude, or at rest, in the position 2$^a$ and for left eye views in the position 2$^b$. An oscillating screen of this type and the elements or sub-elements thereon would be substantially identical with the other types of screens herein disclosed, the difference lying only in the type of film and in the use of a single source of projection or emergence of the rays to the screen, since the stationary types of screen require the use of two or more objectives or sources of apparent emanation of the projected images.

In Figs. 12, 13, 14, 15 and 16 the curvature at the bottom of the element 42 is greater than at the middle, while the top is quite shallow. The curvatures and proportions of the different parts of this element should be so designed that the degrees of surface curvature of and between the sub-elements 43 permits the use of substantially parallel strips both for the sub-elements 43 and the non-reflecting portions 44; for example, if it be determined by calculation, as described in connection with Fig. 33, that the degrees of curvature respectively at the top and bottom of a sub-element should be, say, one degree and two degrees, then the respective radii of the top and bottom of the element will be in the ratio of two to one. It should not be understood that the widths of the sub-elements 43 are all equal or that these widths necessarily bear any direct relationship to the widths of the strips 44. As a matter of fact, any one of the strips 44 may be divided into two strips, thereby leaving a reflecting surface between the two desirable sub-elements, the said reflecting surface functioning in such manner as to reflect light between and not into the desirable viewing areas. When the non-reflecting strips are so divided, however, the width of the non-reflecting area next to the reflecting area should be such as to prevent the entrance of any light rays from either the right or left images into the eyes of an observer in the predetermined line or lines of sight.

In Fig. 17 points 11$^a$, 12$^a$, 13$^a$, are plotted on the spherical surface of the element 1, the location of these points being determined by the equations (1) and (2) as applied to Fig. 5 of the drawings. For example, a ray reflected from the points 11$^a$, 12$^a$, 13$^a$, Fig. 17, would intersect respectively the points 11, 12, 13, Fig. 5; rays reflected from the points 14$^a$, 15$^a$,—19$^a$, would intersect the viewing plane, Fig. 5, at the points 14, 15—19. It is noted that these lines 11$^a$—13$^a$, 14$^a$—16$^a$, 17$^a$—19$^a$ are curved, which shows us that when rays are directed from a given source in front of a screen of spherical curvature, the said source being located on the axis of the screen and at its centre of curvature, the said rays being received upon a reflecting element of spherical curvature on the surface of said screen, the lines upon said elements, which lines 11$^a$—13$^a$, 14$^a$—16$^a$, 17$^a$—19$^a$, reflect light to intersect the viewing surface in vertical planes parallel to the axis of the screen, are curved. The same holds true if the screen be plane or convexly curved, and whether of spherical, ellipsoidal or other curvature. It should be understood that generally the elements to right and left of the vertical plane through the middle of a symmetrical screen will be symmetrical with respect to the said plane, and the same applies to the sub-elements.

In Fig. 18 the spherical element 1 is provided with strips alternately black and white. The white strips or sub-elements 51, 53 are curved and located on the surface of the element in such a position as to be substantially bisected by lines corresponding to lines 11ª—13ª, 14ª—16ª, etc., Fig. 17; the widths of the strips 51, 53 being determined by calculations as set forth in the description of Fig. 33. Strips 50, 52, which may be non-reflecting, blackened, roughened, transparent or light absorbing, are provided between the desirably reflecting areas 51, 53, so that no light is specularly reflected from the said strips 50, 52, into the viewing spaces or into the auditorium. Light from each of the group of sub-elements is reflected into a predetermined, narrow viewing zone, and the light from the group, as a whole, into a series of parallel or slightly oblique, or both parallel and oblique viewing zones, the said zones having been ordinarly definitely laid out and located before the design of the screen or any part thereof is started.

In Fig. 19 the element is divided up into what really amounts substantially to small, spherical, quadrilateral sub-elements, each of which will reflect an incident pencil of light to intersect a small area in a given viewing zone. The advantage gained in adding the cross strips 55 is solely in reducing the amount of light reflected by diffuse reflection from a specular surface, since it is impossible to obtain a 100% specular surface. With the arrangement here shown, it is evident that the observers can be only at predetermined positions in a line such as 9—10, Fig. 2, since rays would not be reflected continuously through its length.

In Fig. 20 sub-elements 56 are equispaced and parallel, and alternately arranged with respect to the non-specular areas 57, the parallel disposition of the strips being rendered possible by using an element having the characteristics of that shown in Fig. 12.

In Fig. 21 the small rectangular areas 58 represent the reflecting sub-elements, all intervening space being blackened. The sub-elements may be parts of a uniformly or non-uniformly curved surface, or may be plane facets, each at such an angle as to reflect light through some small area in the viewing surface, the said area being the space within which an observer of the screen must have either his right or left eye when the right or left pictures are shown. In a screen provided with sub-elements of the types shown herein, it is apparent that (preferably) corresponding sub-elements on every element upon the entire screen should reflect the light received by them to intersect one spot or line only, the said spot or line being one of several from which the entire picture may be viewed. For example, consider that the surface in Fig. 21 shows sixteen sub-elements; then every element on the screen should contain sixteen sub-elements, and there can be but sixteen observers of the picture on the screen. When sub-elements of the types shown in Figs. 12, 18, 20, 22, 23, etc., are used, the number of observers is limited only by the accuracy with which the long curved sub-elements can be made, and since the beams of light intersect long, continuous lines of sight in the viewing surface, there is no point in the said lines where an observer would be unable to see the complete picture on the screen uniformly illuminated from top to bottom and side to side and equally for both the right eye and left eye presentations. If the sub-elements 58 are flat or of curvature either greater or less than that of the general curvature of the element of which they form the working or useful parts, they may be of such size as to be juxtaposed and have contacting edges and so occupy the entire surface of the element, in which case the blackened surface would automatically vanish.

In Fig. 22 the sub-elements 60 and black bands 59 are shown oblique to the vertical. A surface of this type, or modified type, could be used advantageously to reflect light to either a part or the whole of a viewing surface such as shown in Fig. 31.

In Figs. 23 and 24 the general surface of the element 62ª is spherical, the element being provided on the said surface with a plurality of juxtaposed, specularly reflecting sub-elements 61, 62. Although Fig. 24 shows these sub-elements as flat from side to side they may be slightly curved, either concave or convex, to accomplish the desired dispersion of light from side to side in any given viewing area. It is noted that adjacent sub-elements are oblique to each other, the angular relationship between them varying at different parts of the element, adjacent sub-elements being, therefore, eccentrically disposed with relation to each other. Some of the factors determining their angular relationship and curvature both vertically and horizontally, are their position upon the screen as a whole, the arrangement, size and positions of the several viewing zones, the distance from the sub-element to the aperture of the projection lens, the number and position of projection sources employed, and also must be taken into account whether a single element 62ª is provided with sufficient sub-elements to embrace all or only a fractional part of the total number of viewing zones. In designing sub-elements of this type for use on a specular screen procedure should be along the same lines as described in connection with Figs. 5 and 6, it being understood that a surface such as 62 should lie with its upright axis substantially on a line such as 11ᵃ—13ᵃ, Fig. 17, and tangent to the general surface of the curved element, so that projected rays striking the mean, or longitudinal axis of the said sub-element 62 would be reflected in a path or paths substantially identical to that or those of rays received upon and reflected by, say, the line 11ᵃ—13ᵃ, Fig. 17. A curved or warped surface such as 62 must ordinarily be of exceedingly small dimensions, in order that the spacing between surfaces or sub-elements on adjacent elements, which sub-elements reflect light through the same line, shall not be so great as to give the screen the appearance of a coarse half-tone cut such as used for newspaper illustrations. A clear conception of these diminutive surfaces 61, 62 may be obtained, in a greatly magnified degree, by taking a narrow strip of flexible, polished metal—like the mainspring of a clock—and bending and twisting it slightly, when it will be seen that rays received upon it from a bright source of light can be reflected at desired relatively brilliant intensities to produce on a given surface a line of light having almost any desired contour and characteristics. The sub-elements 62, 61 need not necessarily be continuous from top to bottom or side to side, but each may be divided into a plurality of juxtaposed facets or curved parts, one or more of such parts on each element being so disposed with relation to the projected rays incident upon it, or them, to reflect the rays received by it, or them, to pass through a desired point or area in the viewing surface.

In Fig. 25 the angles of the sub-elements 63, 64 are such that they will reflect light into zones between those into which light will be reflected by the sub-elements 61, 62, Fig. 24. A screen provided alternately with the elements shown in Figs. 24 and 25 will illuminate as many, substantially equidistant zones as there are sub-elements on both of the elements 62ᵃ and 63ᵃ combined. Any number of types or groups of elements may be employed on a screen, each element being provided with sub-elements of any desired configuration or performing any desired illuminating or reflecting function, the idea herein disclosed not necessarily being limited to a screen of any certain mathematical curvature, or a screen provided with elements composed of parts all of which are in orderly arrangement or repeated in such arrangement but the scope should be such as to include any possible or feasible arrangement of diminutive specular reflectors, plane or curved, fixed or adjustable, which distribute the rays incident upon them to intersect a given surface in two or more non-adjacent outlines of predetermined form.

In Figs. 26, 27, 28, 29 and 30, the surface of what would be equivalent to a complete element 1, Fig. 1, is divided into three parts, in order to give a greater ratio of length to height. For example, if the view, Fig. 28, were placed to the right of Fig. 27, and Fig. 29 to the right of Fig. 28, the reflecting surfaces 65, 66, 67 would form a continuous arc. The only advantage in the arrangement, here shown, rests in the fact that the surface curvature is extended to such a degree as to mechanically facilitate the location of desired reflecting and non-reflecting areas upon it, such areas being shown in Fig. 18. Is should be understood that the types of sub-elements shown and described in connection with Figs. 23, 24 and 25, or in fact, those elsewhere described, may be employed upon elements having the general characteristics of that shown in Figs. 26 to 30, inclusive: or, broadly considered, the modifications of sub-elements shown in any figure of the drawings may be adapted to the elements shown in any figure.

In Fig. 31 a group of parallel lines 70 intersect obliquely a second set of parallel lines 72, all the lines lying in the proposed viewing surface, any given line in either group corresponding to a line such as 9—10, Fig. 3. The advantage of this arrangement of viewing zones is that there are two zones for each observer, and it is unnecessary that the position of the observer be restricted to permit only of movement of his head in a vertical plane which is parallel to the axis of the screen. The doubling up in the number of zones necessitates, however, a duplication in the number of sub-elements on the screen, since one set of sub-elements reflect the light to only one set of parallel zones.

In Fig. 32 the proposed arrangement of zones is shown by the radial or diverging lines 73, each line 73 representing in plan view the intersection with the viewing surface of beams of light destined for, say, the right eyes of the observers. The lines of intersection for rays for the left eyes would lie between and to the left of each corresponding right eye line. The lines 73 can also be curved, irregular or broken as desired, as can also the viewing lines of any modification herein shown or described.

In Fig. 33 a pencil $P^r$ of light rays whose maximum divergence is the angle $F^{13}$ and whose axis is the line 75, is directed by the objective lens $O^b$ to fall upon the surface of an element $1^b$ (said element as well as the angles shown in this figure are greatly magnified for diagrammatic purposes) which is on the surface of the screen 2. The outside rays 83 and 84 of the incident pencil are received upon a specularly reflecting strip $S^t$ (whose degree of surface curvature is the angle $F^{10}$) on the element and reflected as shown by the arrowed lines to pass through points 85, 86 in the horizontal line 85—86, the distance between points 85 and 86 being the desired width of the reflected pencil at any given spot in the viewing surface. In order to determine the proper degree of transverse curvature of the strip $S^t$ (all angles and distances in Fig. 33 are assumed as being in a horizontal plane, for convenience in calculating; and it should be understood that in determining the true angles and distances, the figures here given should be modified by taking into account also the vertical angles and distances, as pointed out in the description of Figs. 5 and 6,) so that the distance between points 85 and 86 shall be as desired, certain values must be assumed, as follows: (a) The effective aperture $F^1$ of the objective lens $O^b$, or the greatest width of the pencil of rays near the projector lens; (b) The radius $R^d$ of the spherical screen (when a spherical screen is not used $R^d$ would be the distance from $O^b$ to the element on the screen); (c) The ordinate $F^4$ between the axis $A^x$ of the screen and the strip $S^t$; (d) The distances $F^{14}$ and $F^{15}$, locating the point 110, said point being assumed as substantially in the middle of the line 85—86; (e) The length of the dimension line $F^3$, which is assumed as equal to $R^d$, since the dimensions of the element are negligible in comparison to those of the screen; (f) The distance $F^8$, the angles $a$ and $b$, and the angle $21^a$ between the axis 75 of the incident pencil and the axis 77 of the reflected pencil, may be calculated as described in connection with Figs. 5 and 6. On account of the angle $F^{12}$ between the outside rays of the incident pencil being very small, it is possible to assume the axis 77 as substantially bisecting the line 85—86 and also the line 79—80, at the point 110, and also to assume that the angle $F^5$ is equal to the angle $F^{5A}$. (g) Since the width or chord $F^2$ of the reflecting strip $S^t$ is actually negligible in comparison to the width $F^1$ of the incident pencil at the objective lens $O^b$, the angle $F^{13}$ may be assumed as equal to an angle formed between the point 3 at the middle of the strip $S^t$ and the limiting rays 83, 84. It has also been shown in my Patent No. 1,279,262, that a curved reflector having a certain degree of surface curvature will reflect parallel incident light rays through an angle equal to twice the said degree of surface curvature. Taking the above assumptions, the angle $F^{12}$ is found to be equal to $2\times$(angle $F^{10}$)$+$angle $F^{13}$. The base $F^6=F^8 \times \sin F^{12}$; and the base $F^9=F^6 \times \operatorname{cosec} b$. If the maximum length of the bases $F^6$ or $F^9$ be assumed, the angles $F^{10}$ and $F^{13}$ may be computed or determined either graphically or analytically, thereby determining the correct angle, in degrees surface curvature for a characteristic strip $S^t$, so that rays received upon it from the aperture of the objective $O^b$ will embrace a predetermined width of beam $F^9$ at a distance $F^8$ from the point of reflection. Also the position of the strip $S^t$ with relation to the central axis or vertical plane $A^{x1}$ may be determined. Additional factors required in the design of an element or sub-element or of parts thereof, or in determining it or their proportions, curvature, position or obliquity to the general screen surface, may be readily solved; and the above calculations are suggested merely to show the facility with which such factors are determined. It should be understood that the degrees curvature $F^{10}$ of thes strip $S^t$ should ordinarily be varied at different elevations on the said strip; for example, the degrees will increase as the dimension $F^{14}$ or $F^{15}$ increases, or vice versa; and in this connection it may be stated that the strip $S^t$ would be very efficient when designed along the lines of the surface shown in my Patent No. 1,122,192, Fig. 5, that is, the portion of the strip reflecting light to the most distant points would be flat or nearly flat, whereas the porions which reflect to nearer points would be of gradually increasing curvature—it being understood, however, that the degrees curvature are to be determined in accordance with the data given above, in connection with the description of Fig. 33. It should not be assumed that the point 110 is necessarily the proper location for either eye of the observer, since the proper location for his eye should generally be off the center of the reflected beam, as will be readily seen by considering that at certain parts of the viewing zone the width of the reflected beam may be much greater than twice the width between the eyes of the observer. What has to be considered, is the position of the outside rays of the reflected beam, which rays, with either the right or left objective in use must not overlap, at the most, more than the distance between the right and left eyes of any given observer. The total width of the beam, represented by either the line 79—80, or the line 85—86, should never exceed (except for the beams directed to either the extreme left or right viewing one) the distance between the left eye of a given observer and the right eye of an observer to the left of the said given observer.

In Figs. 34, 35 and 36 the curved reflecting elements 90 are long, narrow and staggered. The surface of each of these elements should be provided with non-reflecting strips as shown in Figs. 18, 20, etc.; or with juxtaposed sub-elements as shown in Figs. 23, 24 and 25.

In Figs. 37, 38 and 39 the reflecting elements 91 are sinusoidal or undulating from side to side, and may be provided with sub-elements of any suitable description.

In Fig. 40 the curved lines 92 on the face of the screen 2 indicate typical axes for elements such as those shown in Figs. 17, 18, 20, etc. For example, the longitudinal axis of an element 42 would lie on the curve 92. The determination of the shape of any one of the several curves 92 would involve the plotting of a number of curves such as 14a—16a, Fig. 17, upon several elements in substantially vertical or longitudinal rows, the angle from the vertical of the curve 92 at any point, corresponding to the angle from the vertical of the tangent to the middle point of the line, say, 14a—16a, for an element located at the position shown by the element 42. The advantage of arranging or designing a screen so that the axes of its elements coincide, in front elevation, with the curved lines 92 is that the sub-elements can be grouped in a substantially symmetrical manner about the central oblique axis of the element, and not asymmetrically with respect to an upright axis, as in Fig. 17.

In all the modifications employing oblique elements arranged in rows, as in Fig. 1, the joining portions between adjacent elements, or sub-elements should be blackened or so constructed as to reflect whatever light falls upon them into paths which do not intersect the viewing spaces, as described in my Patent No. 1,279,262. Generally, the most efficient width of reflected beam where it intersects the viewing zones should be such that an observer sitting exactly between two adjacent observers positioned in the proper lines of sight to receive stereoscopic images, would receive a reversed image—that is, the right rays would enter his left-eye and the left rays would enter his right-eye. The spacing of adjacent pairs of zones would ordinarily be from eighteen inches to two feet, or even greater. When it is desired to show pictures having two dimensions, the same as on a mat screen, it is necessary to use one projector only, positioned about half-way between the objectives. Such an arrangement may be conveniently used for showing titles or other photographs taken in one plane. If the widths of the viewing zones are, say, a little less than half the distance between adjacent observers, an observer, when stereoscopic pictures are being shown can, by moving his head either to right or left, see the pictures projected by one objective only, the said pictures being projected at the speed now employed for flat pictures.

A study of Figs. 2, 3, 4 and 33 reveals the fact that there is generally greater latitude of vision for observers in the middle zones of the general viewing space, and for the observers farthest back in the side zones, on account of the angle of sidewise reflection being less than for the front seats of the outside viewing zones.

Since only one eye is actually active at any given time, and one eye or the other is shut off from the screen image, it is apparent that the total screen brilliancy should be twice that required when an observer views the same image with both eyes.

For best results, the right and left views depicting rapid motion, should be taken by a stereoscopic camera either simultaneously or at close intervals; and they should be projected at the same relative intervals: for example, if the time between the registering of two right-eye views is one-twentieth of a second, and between a right and its corresponding left-eye view is one-sixtieth of a second, then, the ratio of the interval between the projection of two right-eye views, to the interval between the projection of a right and its corresponding left-eye view, should be as three to one.

Having thus described my invention, what I claim and desire to secure by Letters Patent of the United States, is:

1. A projection screen made up of a great plurality of juxtaposed elements whose general surface is curved, each of said elements comprising an equal number of curved, substantially contacting, juxtaposed specular reflectors oblique to each other, each of said reflectors controlling the dispersion of light received upon it, from a projector, to embrace one of a plurality of non-adjacent viewing areas; substantially as described.

2. A projection screen made up of a great plurality of juxtaposed elements each comprising an equal and relatively small number of specular reflectors each controlling the dispersion of light received from a projector to embrace one of a plurality of non-adjacent areas; substantially as described.

3. A projection screen made up of juxtaposed elements whose general surfaces are curved, said elements being each divided into an equal number of curved, upright, specular reflectors oblique to each other disposed to form a reflecting surface of non-continuous curvature; substantially as described.

4. A projection screen made up of closely adjacent specularly reflecting elements whose general surfaces are curved, each element being divided longitudinally into a plurality of curved, substantially contacting reflectors controlling the dispersion of light, received upon them from a projector, to embrace a plurality of non-adjacent viewing zones; substantially as described.

5. A projection screen made up of closely adjacent elements each provided with an equal number of juxtaposed specular reflectors each controlling the dispersion of light, received upon it from a projector, to embrace one of a plurality of non-adjacent viewing areas in a given plane, the number of said reflectors on each of said elements being equal to the number of said non-adjacent areas, reflectors correspondingly positioned on each element reflecting light to a corresponding viewing area; substantially as described.

6. A projection screen provided with a great plurality of elements whose general surface is curved, each of the said elements comprising a plurality of sub-elements having a specularly reflecting, light dispersing surface, the transverse degrees of curvature of any sub-element at a given horizontal plane being less than the transverse degrees of curvature between the center-lines of adjacent sub-elements as measured in the said horizontal plane; substantially as described.

7. A projection screen provided with a great plurality of elements whose general surface is curved, each of the said elements comprising a plurality of sub-elements having a specularly reflecting, light dispersing surface, the sum of the degrees of transverse curvature in any given horizontal plane of all the sub-elements upon any given element being less than the transverse angle of curvature of the said element as measured in the said horizontal plane; substantially as described.

8. A projection screen provided with a great plurality of elements each comprising an equal number of minute specular reflectors disposed oblique to each other, each reflector controlling the dispersion of light received from a projector to intersect one of a group of non-adjacent viewing areas, the number of said areas being equal to the number of reflectors disposed on a single element; substantially as described.

9. A projection screen comprising a great number of juxtaposed elements whose general surface is curved and oblique to the general screen surface, each of said elements supporting a relatively small and equal number of specular reflectors controlling the dispersion of light to embrace a group of non-adjacent viewing zones, the general configuration of each of said reflectors being approximately the same as the configuration of the portion of the element occupied thereby; substantially as described.

10. A projection screen provided with a great plurality of groups of specular reflectors, corresponding reflectors in each group controlling the dispersion of light received from a projector to embrace one of a plurality of a group of non-adjacent viewing zones, substantially as described.

11. A projection screen having a surface made up of a great plurality of juxtaposed elements each comprising a relatively small number of specular reflectors each independently reflecting in a predetermined direction and through a predetermined solid angle the light received upon it, from a given source, to intersect one of a plurality of non-adjacent areas in a given viewing plane; substantially as described.

12. A projection screen comprising a great plurality of curved specular reflectors disposed in uniform groups upon the surface of said screen, one reflector in each of said groups dispersing the light received upon it, from a projector located in a given position, to intersect one of a plurality of non-adjacent viewing zones, substantially as described.

13. A projection screen made up of a great plurality of juxtaposed elements each divided into an equal number of specular reflectors, correspondingly positioned reflectors on each element controlling the dispersion of light received upon them, from a suitably positioned projector, to embrace one of a plurality of independent, substantially equidistant, non-adjoining areas of predetermined outline in a given plane; substantially as described.

14. A projection screen having a surface made up of a great plurality of minute specular reflectors controlling the dispersion of light, received upon them from a projector, to illuminate a relatively small number of non-adjacent areas, reflectors controlling the distribution of light to any given one of the said areas being non-adjacent and oblique to each other and uniformly spaced upon the said surface of the screen; substantially as described.

15. A projection screen provided with a great plurality of groups of small specular reflectors, correspondingly located reflectors in each of said groups being disposed to reflect and disperse light rays received upon them, from a suitably located projector, to superimpose upon each other and embrace one of a relatively small number of non-adjacent areas of predetermined outline in a given viewing area; substantially as described.

16. A projection screen composed of a great plurality of juxtaposed specular reflectors arranged in a plurality of juxtaposed horizontal rows oblique to each other, adjacent reflectors in any row being at different angles to each other and each controlling the reflection of light received upon it, from a projector, to embrace one of a plurality of non-adjacent, parallel, substantially equidistant areas of equal width disposed in a given viewing plane; substantially as described.

17. A projection screen provided with a great plurality of elements each comprising an equal number of minute curved specular reflectors eccentrically disposed with relation to each other; substantially as described.

In testimony whereof I hereunto affix my signature.

PAUL L. CLARK.